Figure 1:
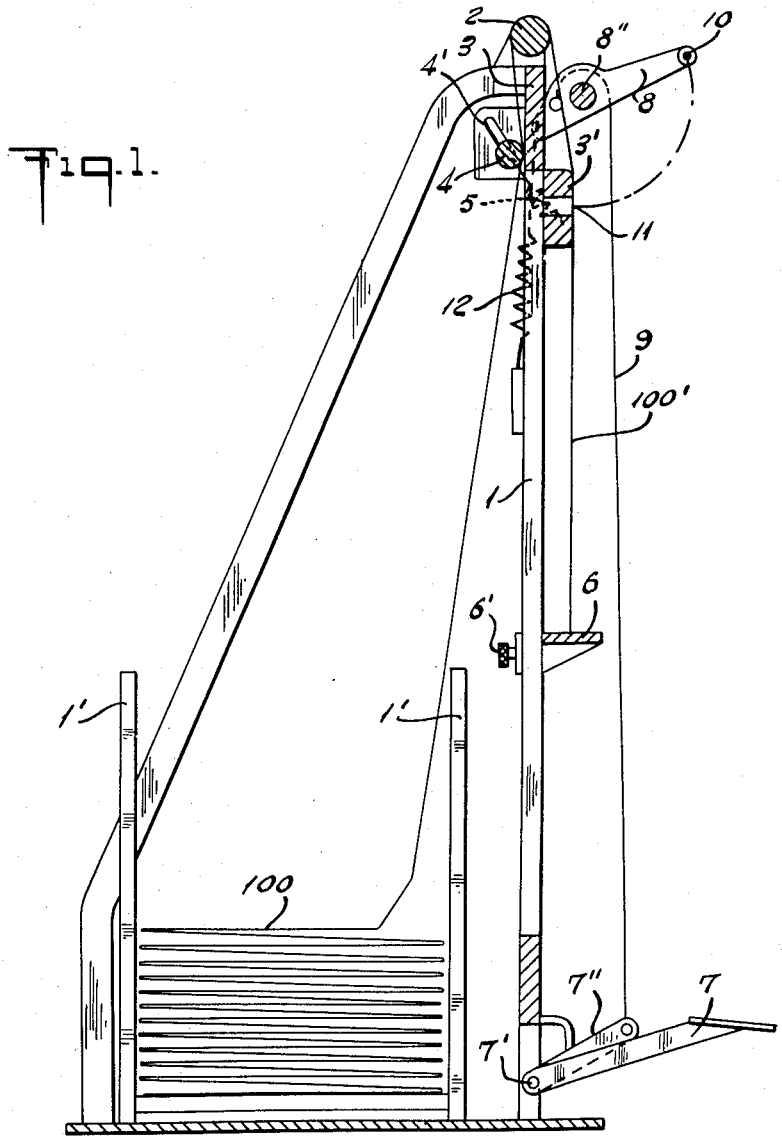

July 7, 1959   R. JACOB ET AL   2,894,106
DEVICE FOR HOT CUTTING OF WOVEN OR KNITTED MATERIALS
OF SYNTHETIC THERMO-FUSIBLE FIBERS
Filed March 25, 1957   2 Sheets-Sheet 1

INVENTORS
RAYMOND JACOB
BERNARD MASSON
BY

ATTORNEY

July 7, 1959  R. JACOB ET AL  2,894,106
DEVICE FOR HOT CUTTING OF WOVEN OR KNITTED MATERIALS
OF SYNTHETIC THERMO-FUSIBLE FIBERS
Filed March 25, 1957  2 Sheets-Sheet 2
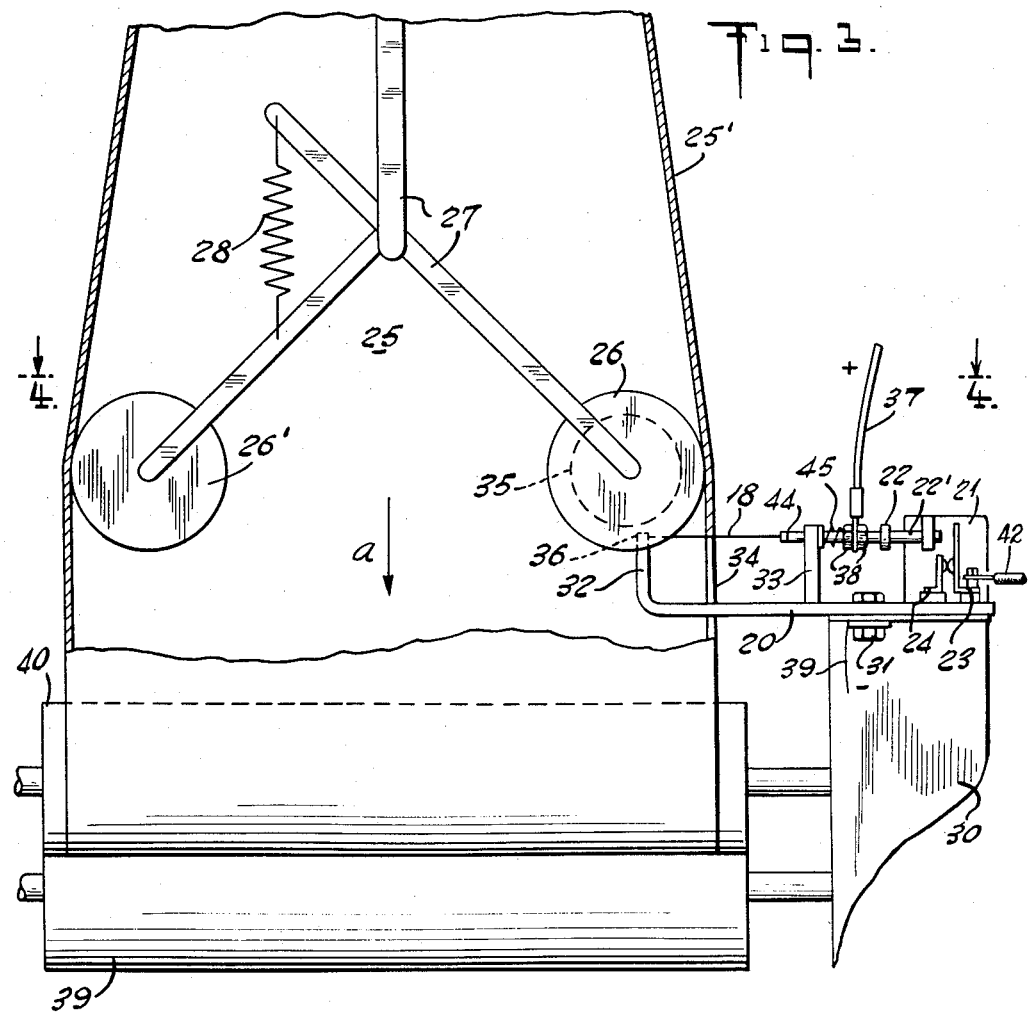
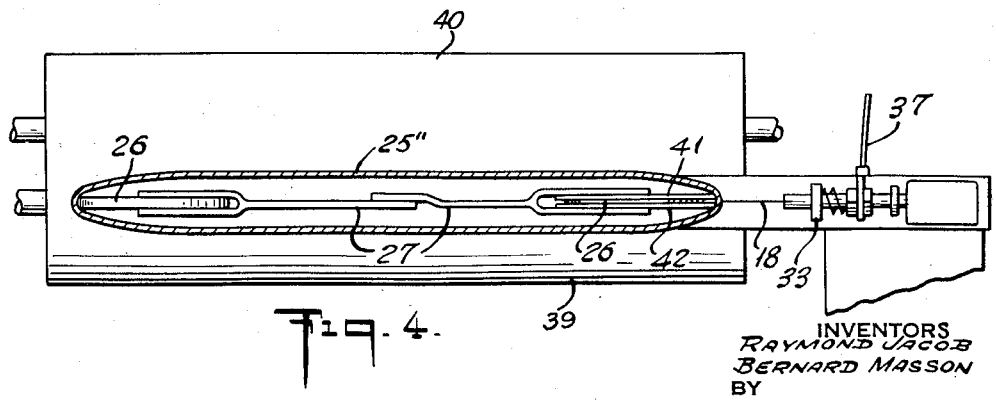
INVENTORS
RAYMOND JACOB
BERNARD MASSON
BY
ATTORNEY United States Patent Office 2,894,106
Patented July 7, 1959

2,894,106

DEVICE FOR HOT CUTTING OF WOVEN OR KNITTED MATERIALS OF SYNTHETIC THERMO-FUSIBLE FIBERS

Raymond Jacob, Eaubonne, and Bernard Masson, Courbevoie, France, assignors to Societe d'Applications Generale d'Electricite & de Mecanique, Paris, France Application March 25, 1957, Serial No. 648,424

Claims priority, application France April 6, 1956

6 Claims. (Cl. 219—29)

The invention relates to a device for hot cutting of woven or knitted materials of synthetic thermo-fusible fibers. Conventionally, fabrics consisting of synthetic incombustible fibers are cut with a warm blade at a relatively low temperature, as e.g. 300° C. The conventional methods thus to cut materials of the mentioned kind has severe drawbacks and difficulties are encountered where it is required to obtain a straight-lined cut, particularly in heavy woven materials. It is also difficult properly to adjust the pressure during the shifting of the cutting instrumentality. It happens, therefore, that the fabric is drawn along which results in a saw-tooth cut, or the material is so fused at certain points that irregular beadings are formed at the edge of the cut. Furthermore, with doubled or tubular material it also occurs that the two thicknesses of material cling together which renders it difficult to slit the layers apart without ravelling them.

The invention aims therefore to provide a device whereby the mentioned drawbacks will be avoided, that means, a device whereby a faultless cut of woven or knitted materials, flat as well as tubular, can be obtained.

The invention further aims to provide a device wherein the cutting element operates by fusion and essentially comprises an electric resistance consisting of a metallic wire heated to incandescence.

Another object of the invention is the provision of means to hold the relatively fine and flexible wire straight-lined notwithstanding the dilatations and contractions caused by temperature changes wherein said means comprise a system of a tension compensator including a spring, a weight or another element having similar effects.

Finally, the invention contemplates so to hold and arrange the fabric where the cutting takes place that it is lightly tensioned in a free zone, that the heated wire can act on the fabric without appreciable pressure and that the fabric cannot be clamped between the heated element and a hard surface.

Figure 2:
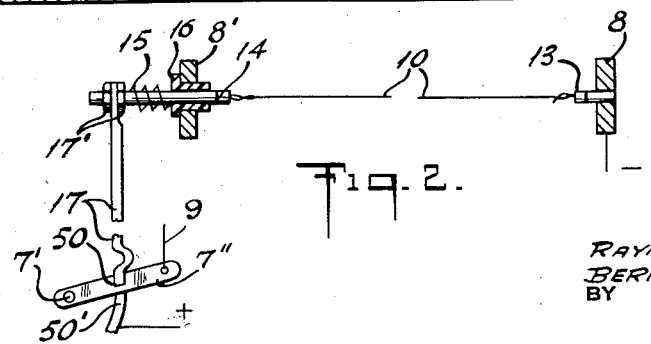

Further objects and details of the invention will be apparent from the description given hereinafter and the accompanying drawing illustrating two embodiments thereof by way of example. In the drawing:

Fig. 1 is a diagrammatic longitudinal section of a device according to the invention, Fig. 2 is an illustration of the cutting element in the device of Fig. 1, Fig. 3 is a diagrammatic illustration of another device, and Fig. 4 is a section along line 4—4 of Fig. 3.

Referring now to the drawing, Figs. 1 and 2, the illustrated cutting machine according to the invention comprises a frame 1 between the uprights 1' of which the fabric 100 to be cut is stored. The fabric runs over the fixed top roller 2 and then with its end portion 100' down in front of the frame 1. Means are provided for preventing the fabric from falling back on the stored portion. For this purpose, there is a plate 3 arranged underneath the roller 2, and another roller 4 has its axle rotatable in an inclined slot 4' so that roller 4 tends to slide down in the slot and to press against the plate 3. The fabric pressed between the plate 3 and roller 4, before reaching roller 2, is pinched between the mentioned parts. It will be understood that when the end portion 100' is pulled down, there will be a force component raising the roller 4 so that the fabric can pass without any appreciable resistance. If, however, the portion 100' is not pulled down, the portion between the roller 2 and the stored fabric will tend to drop down. Thereby, however, the roller receives a downward component so as to act as a brake pressing the fabric against the plate 3 and preventing its movement. In order to add to the gravity force of the roller 4, a spring 5 is tensioned between each end of the roller axle and a transverse piece 3' secured to the front of the frame 1. An adjustable bracket 6 extends transversely of and is shiftable vertically at the front of frame 1. A set screw 6' allows to secure the bracket 6 in an adjusted position. The bracket serves to determine the length to which the fabric portion 100' is to be pulled down each time a portion is to be cut off. Two levers 8 and 8' are pivoted to the frame 1 at 8" so as to be rockable together. Springs 12 are fastened with their lower end to the frame and with their upper ends to the rear arm of the levers 8 and 8' so as to raise the front arms of the associated levers. Between the front ends of both levers 8 and 8' a cutting wire 10 is stretched, as clearly shown in Fig. 2. Means are provided to maintain a certain predetermined tension in the wire regardless of dilatations and contractions due to changes of its temperature so that the wire is straight-lined between the levers at all times. For this purpose, the wire is fixedly secured with its one end 13 to the front arm of lever 8. Its other end is secured to the one end of a rod 14 which is lengthwise shiftable in an insulated bushing 16 located within the front end of the lever 8'. Near the other end of the rod 14, an electrical conductor 17 is attached to the rod by means of collars or nuts 17'. A spring 15 is positioned between the one nut 17' and the bushing 16 so as to stretch the wire 10 with a predetermined tension. As stated hereinbefore, other suitable and conventional means may be substituted for the spring 15 in order to maintain a desired wire tension. Now it will be clear that by connecting conductor 17 to the one pole of a current source (not shown) and the frame to which the wire end 13 is conductively secured through arm 8 to the other pole, the current passing through the wire will heat the latter to a temperature according to the resistance of the wire and the voltage applied. The levers 8 and 8' can be turned down with their front ends so far that the wire 10 will bear against the fabric portion 100' opposite a slot 11 in the transverse frame member 3' where the wire can cut through the fabric. Hence, the wire does not bear or urge the fabric against a solid portion of the frame. In order to turn the levers 8 and 8', a pedal 7 is pivoted at 7' to the foot portion of the frame. An arm 7" is secured to the pedal and connected by a drawing means, such as flexible members 9, to the levers 8 and 8'.

In the operation of the machine, the free end of the fabric 100 is first passed through between plate 3 and roller 4 and, then, pulled over roller 2 and down in front of the transverse member 3'. It will be noted that the arrangement is such that there is a slight tension of the material along the line where the cutting is performed. In the illustrated embodiments, the means to apply such tension is the weight or gravity of the hanging-down portion 100' of the fabric. The operator will pull the end of the portion 100' down so far that the edge contacts the top face of bracket 6. When, then, the current is switched on and the wire is incandescent, the operator will step on pedal 7 thereby bringing down the levers 8 and 8' against the restraint of springs 12 so that the heated wire can cut through the fabric at the slot 11, and the severed portion 100' will drop down. When the pedal is released, the levers will swing back under the force of the springs 12. In order to make the subsequent cut, the operator will grip the fabric between roller 2 and transverse member 3', pull it down until fabric edge touches the bracket 6 whereupon an actuation of the pedal will accomplish the subsequent cut.

In many instances it is desirable that the current in the resistance wire 10 is interrupted during the stopping of the machine. This can be readily accomplished by a contacting device, operative e.g. by the arm 7'', as diagrammatically indicated in Fig. 2. According to this figure, the conductor 17 extends downwardly with sufficient slack to an insulated contact piece 50 on the arm 7'' which is shown in the position according to the raised position of the pedal 7 in Fig. 1. A contacting segment 50' engageable by the piece 50 is connected to a current source, not shown. Now it will be clear that when the arm 7'' is in the illustrated position, the current is interrupted. As soon, however, as the arm 7'', following an actuation of the pedal, comes down connection between the piece 50 and the segment 50' will be established so that the heating current can flow from the current source through the contacts 50', 50, the conductor 17, rod 14, wire 10, arm 8 and back to the current source. If the pedal is returned to its position of rest, the current will be switched off.

The principle hereinbefore disclosed remains valid for any other, e.g. horizontal apron machine with automatic feeding of one or several cloth widths, which thus may be cut simultaneously.

A similar cutting device can also be used in connection with a circular loom for obtaining open flat woven goods of one or several widths. Figs. 3 and 4 diagrammatically illustrate such device. In these figures, the fabric 25 comes in tubular form at 25' from a circular loom not shown, moves downward and is spread by two rollers 26 and 26' held by a linkage 27 and urged apart by a spring 28 so as to take the substantially oval shape 25'' shown in Fig. 4, between the rollers 26, 26' and rollers 39 and 40, as it will be described hereinafter. It is to be noted that in addition to the transverse spreading of the fabric, a slight vertical tension may also occur. A frame 30 carries a horizontal support 20 secured by a screw 31 to the frame. The support extends from the outside through a slit 34 underneath roller 26 into the elliptically spread fabric 25'' where the support ends in a vertical arm 32, reaching upwards into a peripheral groove 35 of the roller 26. Another vertical support arm 33 is provided outside the fabric close to the frame 30. A cutting wire 18 extends between the support arms and is conductively secured directly to the arm 32 at 36. The other end of the wire is fastened to the one end of a rod 44 which is insulatedly passed through arm 33 so that it can slide lengthwise. Now it will be clear that the wire is located in the center plane of the grooves 35 where the fabric is slightly tensioned by the roller flanges 41 and 42, as clearly shown in Fig. 4. On the opposite side of the arm 33, the rod carries a conductor 37 clamped to it between two adjustable nuts 38, and a spring 45 between these nuts and arm 33 stretches the wire according to the adjustment of the nuts. Another conductor 39 is attached to the screw 31. Thus, a current can flow from a source not shown, through the conductor 37, rod 44, wire 18, support 32, 20, screw 31, conductor 39 back to the current source. Hence, the arrangement of the cutting wire is similar to that shown in Fig. 2 and the difference in the length of the wire due to dilatations and contractions will be taken up as hereinbefore described. Now it will be clear that if the wire 18 is heated to incandescence and the fabric 25 is moved downward in the direction of the arrow a, the fabric will be continuously cut or slit by the wire as visible at 34. It is to be noted that the cutting wire is applied to the fabric where the latter is subject to a slight tension, whereby pressure of the wire on the fabric can be avoided. The material cut in this manner will be continuously passed on as a one width, doubled sheet to the guide or take up rollers 39 and 40. It will be readily understood that more than one wire 18 with accessorial parts may be arranged at different points of the circumference of the tubular material. If this is done, as many partial widths as there are cutting wires applied will be obtained simultaneously wherein, of course, the total of the partial widths of the fabric will be equal to the single widths obtained with the arrangement of Figs. 3 and 4.

In many instances it is desired that the machine and particularly the feeding of the fabric 25 will be automatically stopped in the event a break of the cutting wire occurs. For this purpose, a push button 22 having a shank 22' is guided in an attachment 21 so as to be shiftable coaxially with the rod 44 against which it bears without substantial pressure. Two contact pieces 23 and 24 are mounted on the support 20. The contact piece 24 is conductively connected to that support whereas the piece 23 is insulated but connected to a conductor 42 which, via a driving motor (not shown) for the fabric movement, may lead back to the mentioned current source. Normally, the two pieces 23 and 24 contact each other so that the mentioned motor can be charged with current. However, should a break of the wire 18 occur, spring 45 will shift rod 44 and through it the push button 22 to the right hand side in Fig. 3 against the upper end of the contact piece 23 and thereby bending it away from the piece 24. Thus, the circuit including the mentioned motor will be interrupted and the movement of the fabric will be stopped at the same time when the current through the wire is interrupted.

The devices according to the invention can serve many purposes and can be applied to many types of machines one of which, for instance, are the cutting machines in the manufacture of sacks, and it will be apparent that the length of the cutting wire can be adapted to the exigencies of each case. Furthermore, in connection with the cutting devices hereinbefore described, it will be noted that upon the contact of the incandescent wire with the fabric, the fusion is instantaneous and the two lips of the material will separate immediately due to the light tension of the material caused either by the gravity of a substantial length of the fabric, as in Fig. 1, or by additional means as e.g. by the spring 28 which spreads the rollers 26 and 26' in Figs. 3 and 4. Also a too considerable and harmful fusion will be prevented and any welding with a subsequent layer or layers of the material will be avoided. By the present arrangement, a very clean cut edge will be obtained which does not form hard beadings and nevertheless prevents any ravelling, whereas the different threads which constitute the fabric will be sufficiently welded among themselves.

It will be apparent to those skilled in the art that many alterations and modifications of the structure illustrated and described can be made without departure from the essence and spirit of this invention which for that reason shall not be limited but by the scope of the appended claims.

We claim:

1. A cutting device for woven or knitted fabric of synthetic thermo-fusible fibers, comprising an electrically heatable wire, means to hold said wire stretched in a direction substantially transverse to the plane of said fabric, said means urging the ends of said wire away from each other, means for moving said fabric past said wire, and means responsive to a predetermined increase in the distance of said wire ends for stopping the movement of said fabric past said wire, whereby movement of said fabric is stopped if said wire breaks.

2. A device as in claim 1, said means for holding said wire stretched comprising two parallel arms connected at their one ends, said wire being secured with one of its ends to the free end of the first one of said arms, an insulating bushing in the free end of the other arm and axially directed towards said first arm, a rod inside of and extending with both ends from said bushing, the other wire end being connected to the rod end facing said first arm, attachment means for an electrical conductor on and adjustable lengthwise of said other rod end, a compression spring on said other rod between said second arm and said attachment means, and current conductive means connected to said first wire end.

3. A cutting device for woven or knitted fabric of synthetic thermo-fusible fibers, comprising an electrically heatable wire, means to hold said wire stretched in a direction substantially transverse to the plane of said fabric, said means urging the ends of said wire away from each other, means for moving said fabric past said wire, and means responsive to a predetermined increase in the distance between said wire ends for stopping the movement of said fabric past said wire, whereby movement of said fabric is stopped if said wire breaks, said means for holding said wire stretched comprising two parallel arms connected at one of their ends, said wire being secured with one of its ends to the free end of one of said arms, a rod insulatedly slidable in the end of said second arm, one end of said rod projecting towards said first arm and having secured thereto the other wire end, the other rod end projecting from the other side of said other arm, means attached to said other rod end and tending to shift said rod away from said first arm, a normally closed contact including two contacting elements, said rod being operative to open said contact by a shift of said rod upon a break of said wire, a first current conductive means electrically connected to said first wire end and one of said elements, and two other current conductive elements connected to said rod and said other element, respectively.

4. A cutting device for woven or knitted fabrics of synthetic thermo-fusible fibers comprising two spaced supporting means for said fabric so as to hold said fabric slightly tensioned but unsupported therebetween, an electrically heatable resistance wire, first means to hold said wire stretched independently of its dilatations and contractions due to temperature changes, said first means being reciprocal between a first position in which said wire is remote from a fabric supported by said supporting means and a second position in which said wire is applied to the fabric intermediate said supporting means, a second operable means to reciprocate said first means, and a third means responsive to the operation of said second means to switch on a heating current to said wire upon a movement of the latter from the first to the second position and to switch off the current upon a movement from the second to the third position.

5. A cutting device for woven or knitted fabrics of synthetic thermo-fusible fibers comprising two spaced supporting means for holding said fabric slightly tensioned but unsupported therebetween when said fabric is moved over said supporting means, second means for continuously moving said fabric over said supports, an electrically heatable resistance wire, third means to hold said wire stretched independently of its dilatations and contractions due to temperature changes in a plane intermediate and in the vicinity of said supporting means and across the plane of the moving fabric, and fourth means responding to a movement of a part of said third means for stopping said second means upon a break of said wire.

6. A cutting device for tubularly woven or knitted fabrics of synthetic thermo-fusible fibers comprising first means adapted to engage the fabric from the inside to spread it outwards at at least one point, said means including at least one peripherally grooved roller, electrically driving means to continuously move said fabric in an axial direction coincident with the plane of said roller groove, whereby said fabric during its movement is slightly tensioned between the groove-flanking flanges of said roller, an electrically heatable resistance wire, means to hold said wire stretched independently of its dilatations and contractions due to temperature changes in said plane and close to the roller, said wire extending from the outside into the interior of said tubular fabric, means to charge with current said electrically driving means and said wire, and an interrupter responsive to a movement of said wire-holding means upon a break of said wire to cut off the current to said driving means.

References Cited in the file of this patent

UNITED STATES PATENTS

| | | |
|---|---|---|
| 1,445,992 | Cameron | Feb. 20, 1923 |
| 1,641,658 | Berglund | Sept. 6, 1927 |
| 2,004,580 | Meyer | June 11, 1935 |
| 2,035,138 | Maxfield | Mar. 24, 1936 |
| 2,471,310 | Charles | May 24, 1949 |
| 2,692,328 | Jaye | Oct. 19, 1954 |